US007844237B2

(12) United States Patent
Cheung et al.

(10) Patent No.: US 7,844,237 B2
(45) Date of Patent: Nov. 30, 2010

(54) RADIO FREQUENCY SIGNAL FOR DETERMINING LOCATION

(75) Inventors: Matthew Cheung, Redmond, WA (US); Christopher Ross Jordan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 11/380,610

(22) Filed: Apr. 27, 2006

(65) Prior Publication Data

US 2007/0254611 A1 Nov. 1, 2007

(51) Int. Cl.
*H04B 1/18* (2006.01)
(52) U.S. Cl. .............. 455/166.1; 455/160.1; 455/434; 455/161.1; 455/456.1; 455/404.2
(58) Field of Classification Search .............. 455/166.1, 455/154.2, 434, 160.1, 161.1, 517, 403, 422.1
See application file for complete search history.

(56) References Cited

U.S. PATENT DOCUMENTS

| 4,352,208 | A | * | 9/1982 | Schroeder | 455/266 |
|---|---|---|---|---|---|
| 4,566,034 | A | * | 1/1986 | Harger et al. | 348/734 |
| 5,230,081 | A | * | 7/1993 | Yamada et al. | 455/456.3 |
| 5,303,398 | A | * | 4/1994 | Tults | 455/182.1 |
| 5,388,123 | A | * | 2/1995 | Uesugi et al. | 375/234 |
| 5,475,709 | A | * | 12/1995 | Futagami et al. | 375/224 |
| 6,031,883 | A | * | 2/2000 | Sanderford et al. | 375/344 |
| 6,307,897 | B1 | * | 10/2001 | Ohta et al. | 375/316 |
| 6,389,273 | B1 | * | 5/2002 | Brandenburg | 455/296 |
| 6,879,838 | B2 | * | 4/2005 | Rankin et al. | 455/456.6 |
| 2004/0147267 | A1 | * | 7/2004 | Hill et al. | 455/456.1 |
| 2004/0203839 | A1 | * | 10/2004 | Ostberg et al. | 455/455 |
| 2005/0143062 | A1 | * | 6/2005 | Dowling | 455/423 |
| 2005/0258957 | A1 | * | 11/2005 | Krumm et al. | 340/539.13 |
| 2005/0288015 | A1 | * | 12/2005 | Azizi et al. | 455/434 |
| 2006/0211431 | A1 | * | 9/2006 | Mansour et al. | 455/456.2 |
| 2007/0004394 | A1 | * | 1/2007 | Chu et al. | 455/422.1 |
| 2008/0161014 | A1 | * | 7/2008 | Monnerat | 455/456.1 |

* cited by examiner

*Primary Examiner*—Huy Phan
(74) *Attorney, Agent, or Firm*—Shook, Hardy & Bacon L.L.P.

(57) ABSTRACT

Systems and methods of position sensing for a receiver, via employing an ability thereof to receive signals in a broader range than what such receiver is initially tuned for. A frequency skip component can skip channel frequencies such that the spectrum range is scanned without a typical requirement of tuning to all the channels during such scan. Accordingly, the subject innovation enables the entire spectrum of interest to be scanned at a substantially reduced amount of time. Location interpolation for the receiver and time stamping of received signals can be implemented as part of the position sensing.

18 Claims, 10 Drawing Sheets

RADIO FREQUENCY SIGNAL FOR DETERMINING LOCATION

BACKGROUND

Technological advances in computer hardware, software and networking have lead to efficient, cost effective computing systems (e.g., desktop computers, laptops, handhelds, cellular telephones, servers, . . . ) that can communicate with each other from essentially anywhere in the world in order to exchange information. These systems continue to evolve into more reliable, robust and user-friendly systems. Furthermore, these systems allow locating people, equipment, and other tangibles. Such systems are further employed in providing directions (e.g., driving directions) and/or maps, controlling access to restricted areas, monitoring inventory (e.g., theft prevention), and the like.

A number of location sensing technologies are commonly available. Examples of location sensing systems can include, Active Badges, Active Bats, MotionStar, VHF Omni-directional ranging, Cricket, MSR radar, Easy Living, Smart Floor, and Global Positioning System (GPS). Each one of these systems has its respective limitations. For example, location techniques that employ satellite based GPS signals for range measurements, lack signal availability in covered in-door environments where line of sight to the satellites is not available.

Another type of location sensing technology is radio-based. Radio-based location systems typically utilize a database of radio base station locations. One can determine the location of a receiver by analyzing the signal received and having prior knowledge of the location of the source of those signals. For example, a mobile radio can detect some of these base stations, and a triangulation routine can be invoked to estimate a location of the mobile radio as a function of known locations of the detected base stations. Knowledge of the signal source location plays an important role in such systems.

Moreover, disparate types of radio base stations have been employed in such systems including, for instance, Wi-Fi (e.g., 802.11), cellular, FM radio, AM radio, TV station, and the like. However, the database of base stations can be incomplete or become out of date as base stations are moved, removed, and added. Such problem poses critical challenges for Wi-Fi, since these base stations are easy to buy, install, and/or reinstall in a new location.

The radio source location can be determined by using a radio surveillance process, where the signals are first collected and subsequently analyzed to compute the signal source location. For example, a conventional technique utilized to determine source locations, and updating of the database of base stations can be wardriving. Wardriving involves searching for Wi-Fi wireless networks by a moving vehicle. For example, a wardriver can employ a Wi-Fi equipped computer (e.g., laptop, personal digital assistant, and the like) to detect the networks (e.g., wireless access points, base stations). Moreover, a GPS can measure and log locations of the network as a car or truck traverses within a geographic region.

Accordingly, a mobile receiver records received signals during motion, while at the same time periodically recording a respective location, as determined by devices such as the GPS receiver. A frequency range can then be scanned linearly, while incoming packets of data related to the received signal are recorded as they arrive. The collected data is then analyzed to estimate the position of the radio source.

The limited frequency scanning rate that pertains to such approach can cause short duration signals to be missed. Put differently, incoming signals that have a short detection period are not properly identified by the linear scan of the frequency spectrum. Moreover, periodic location assessment can cause received signals to be falsely grouped together at places where the location information was received. Additionally, any delay in the processing pipeline can further introduce errors in the true location of the received and recorded signals. Employing faster equipment to increase resolution and expedite processing can somewhat mitigate these problems, however associated costs will substantially increase.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for position sensing of a receiver, via employing a signal analyzer system that has a frequency skip component(s). The frequency skip component exploits an ability of the receiver, which is associated with the signal analyzer system, to receive signals in a broader range than what such receiver is initially tuned for. For example, in a scenario of an 11 channel spectrum, signals transmitted on channel 3 can be detected on channel 2 and channel 4, (which are adjacent channels to channel 3) albeit at a substantially weaker strength (such as having a channel tolerance of "B"=1, where B is an integer, to detect neighboring channels that are ±B above/below what the receiver is tuned for.) The frequency skip component can skip channel frequencies such that the spectrum range is scanned without a typical requirement of tuning to all the channels during such scan. Thus, in an 11 channel spectrum scenario, the initial scan can be performed by a channel selection of 1, 4, 7, and 10. Accordingly, when tuned to channel 1, signals that appear on neighboring channel 2 can also be detected. Likewise, when tuned to channel 4, signals that show on channels 3 and 5 can be detected. Such can be followed by a subsequent channel selection of 2, 5, 8, 11, and a later channel selection of 3, 6, 9, as implemented by the frequency skip component. Hence, the frequency skip component can optimize frequency switching, to obtain a three fold increase of scanning speed, as illustrated in the above example. As such, the subject innovation enables the entire spectrum of interest to be scanned faster and at a substantially reduced time period.

Such switching of frequency is determined based in part on sensitivity of the receiver (e.g., what on/off bands the receiver can pick up), the communication spectrum employed, and the like. For example, the frequency skip component can designate the channel selected at interval "m" (m being an integer) as:

$$\text{Channel at Interval } m = [1 + (2B+1) \times m][\operatorname{Mod} N]$$

wherein;
N=number of interested channels, and
B=±channel tolerance, which is number of neighboring channel(s) that can be detected at above/below a channel that the receiver is tuned for.

In a related aspect, the signal analyzer system can further comprise a location interpolation component that evaluates kinetics/dynamics data for a motion of the signal analyzer system and/or receiver, and further consider such data in related calculations (e.g., determining location of the transmitter based on signal strength.) The data can include: path traveled by the analyzer component, speed, velocity, acceleration, and the like. Accordingly, a location of the analyzer component and/or receiver can be estimated by considering a difference between a prior known position and a next known position, and a time that a signal is received at such estimated location. Hence, inaccuracies related to clustering of signals (e.g., associating received signals with known positions, as opposed to actual positions that signals were received) can be mitigated. A linear interpolation can also be employed, such as:

Estimated Location of Receiver at Time of Receiving Radio Signal=

$$p_1 + (p_2 - p_1) \times \left(\frac{t_r}{t_2 - t_1}\right)$$

wherein;
$t_r$=time of reception of signal;
$t_1$=time of report for prior known position of receiver;
$t_2$=time of report for next known position of receiver;
$p_1$=prior known position at time of $t_1$; and
$p_2$=next known position at time $t_2$.

According to a further aspect of the subject innovation, a time stamp component, which is associated with the signal analyzer system stamps incoming data at time of reception of signal. Hence, inaccuracies that result from delays in processing capacity can be mitigated, and position of the signal analyzer system can be adjusted accordingly. Moreover, collection of data can be optimized by employing a plurality of synchronized receivers to improve efficiency. The receivers can further be synchronized, so they typically do not receive a same frequency at a same time. Relative abundance of signal frequencies can be considered when distributing frequency assignments between such receivers. The frequency distribution can be predetermined or can be set during operation and employed for adjusting frequency assignment.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
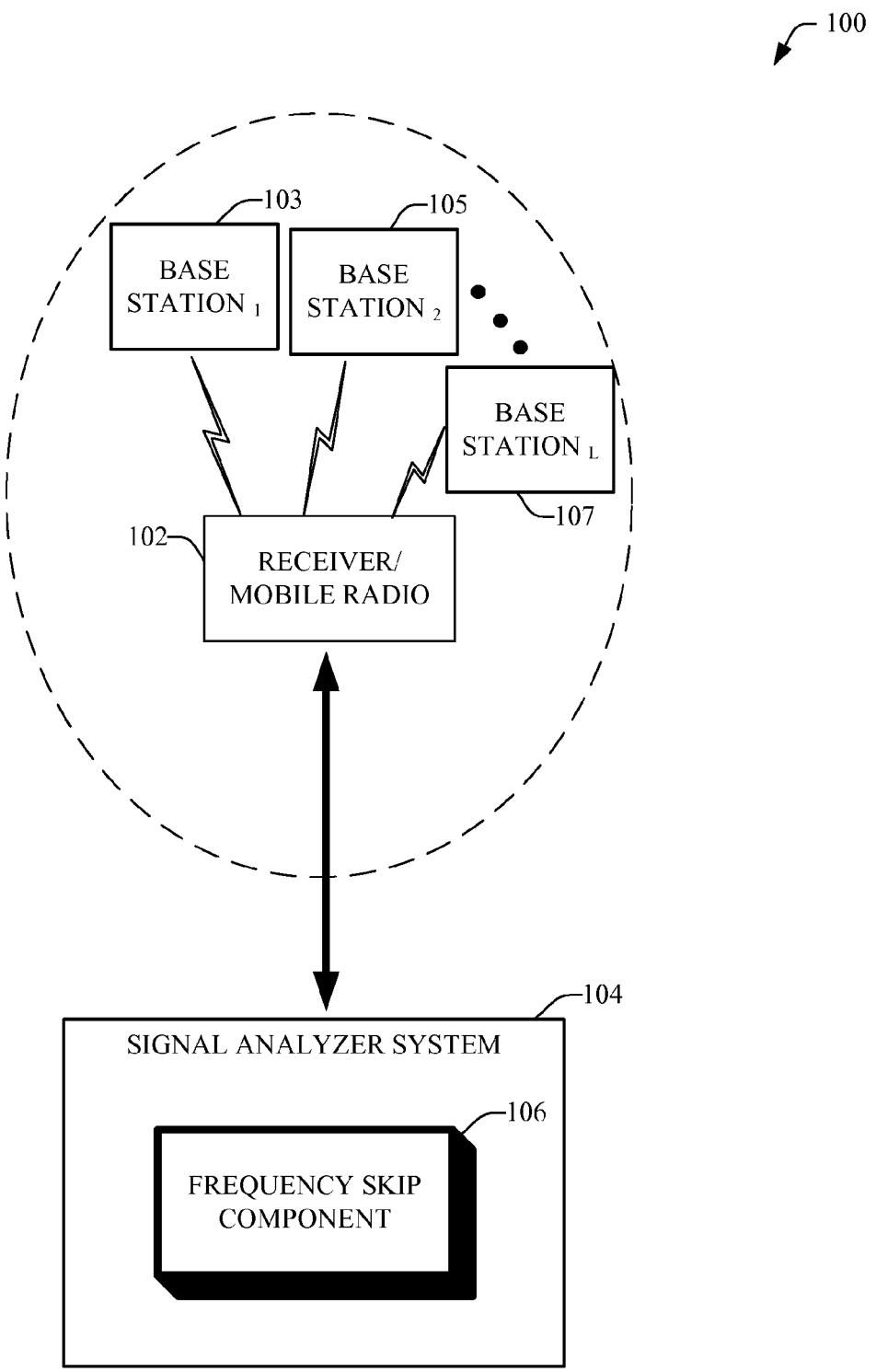
FIG. 1 illustrates a block diagram of locating a position for a signal analyzer system/receiver in accordance with an aspect of the subject innovation.

The subject innovation provides for locating a position of a receiver, via employing a signal analyzer system or unit that has a frequency skip component(s). FIG. 1 illustrates a system 100 that facilitates locating a position of the receiver 102 via employing a signal analyzer system 104 associated therewith. The signal analyzer system 104 has a frequency skip component(s) 106 that exploits an ability of the receiver 102, to receive signals in a broader range than what such receiver 102 is initially tuned for. The frequency skip component 106 skips channel frequencies such that the spectrum range of desired frequencies is scanned without a typical requirement of tuning to all the channels of the spectrum during the scan.

The signal analyzer system 104 interacts with the receiver 102, which in turn can be a mobile radio that can wirelessly communicate with any number of base stations 103, 105, 107 (1 thru L, L being an integer), to identify a location of the mobile radio based upon a detected base stations 103, 105, and 107. A database (not shown) can contain data (e.g., data relating to location information, base station identifying data, and the like) which are associated with identified base stations. Such data is periodically updated, to account for base stations that have been added, removed, moved, and modified.

The mobile radio of the receiver 102 can include: a cellular telephone, a cordless telephone, a personal computer, a laptop computer, a handheld computer, a personal digital assistant (PDA), or any device having wireless connection capability, for example. Additionally, the mobile radio of the receiver 102 can cover a sensing zone/area, where the receiver can pick up receiving signals from base stations/access points.

Moreover, any number of base stations can be within such sensing zone that corresponds to the receiver 102 and its mobile radio, and any number of base stations can be positioned outside of the sensing zone at other locations. Similarly, base stations 103, 105, 107 can be positioned within any number of disparate sensing zones related to different mobile radios. Moreover, base stations 103, 105, 107 can include Wi-Fi access points (e.g., 802.11), cellular towers, AM radio stations, FM radio stations, TV stations, other type of electromagnetic transmitting stations, or a combination thereof. It is to be appreciated that the base stations 103,105,107 can be stationary or mobile.

The mobile radio of the receiver 102 can detect any of the base stations 103, 105, 107 positioned within a corresponding sensing zone. As illustrated, the receiver 102 can interact with the signal analyzer system 104 (e.g., provide a query thereto), to enable determining a position associated with the receiver 102 and its mobile radio. For example, the signal analyzer system 104 can receive a list of the detected base stations 103, 105, 107, and also include data related to strength of signals obtained from such base stations. The signal analyzer system 104 can utilize a triangulation technique to estimate the location of the receiver 102 associated therewith; as a function of the location(s) of the detected base stations 103, 105, 107 that are known (e.g., included in the base station database). It is to be appreciated that the signal analyzer system 104 can be part of the receiver 102 that further includes the mobile radio.

The frequency skip component 106 of the signal analyzer system 104 increases a scanning speed of the spectrum of frequencies that are of interest via leveraging from an ability of the receiver 102, to receive signals that are broader than what such receiver 102 is initially tuned for. For example, in a scenario of an 11 channel spectrum, signals transmitted on channel 3 can be detected on channel 2 and channel 4, albeit at a substantially weaker strength. The frequency skip component 106 can skip channel frequencies such that the spectrum range is scanned without a typical requirement of tuning to all the channels during such scan. Thus, in the 11 channel spectrum scenario, the initial scan can be performed by a channel selection of 1, 4, 7, 10, which is subsequently followed by a channel selection of 2, 5, 8, 11, and a later channel selection of 3, 6, and 9, as implemented by the frequency skip component. Hence, the frequency skip component 106 can optimize frequency switching, to obtain a three fold increase of scanning speed, as illustrated in the above example. Accordingly, the subject innovation enables the entire spectrum of interest to be scanned at a substantially reduced amount of time. Such frequency skipping can typically be implemented in a non-linear and/or non-randomized fashion.

For example, the frequency skip component can designate the channel selected at interval "m" (m being an integer) as:

Channel at Interval $m = [1 + (2B+1) \times m][\text{Mod } N]$ wherein;

N=number of interested channels;

B=±channel tolerance, which is number of neighboring channel(s) that can be detected at above/below a channel that the receiver is tuned for. Hence, for a sixth interval of channel selection (m=6), and tolerance of one channel (B=±1), in an 11 channel spectrum (N=11); the channel selected at sixth interval is identified as:

$$= [1 + (2B+1) \times m][\text{Mod} N] =$$
$$= [1 + (2 \times 1 + 1) \times 6][\text{Mod} 11] =$$
$$= [19][\text{Mod} 11]$$
$$= 8$$

which indicates that channel 8 will be selected at the sixth interval.

The receiver 102 having the mobile radio can communicate with a base station database (not shown) to obtain base station coordinates (e.g., related to detected base stations 103, 105, 107). The content of the base station database can depend upon the radio system and/or a type of electronic endpoint utilized for location purposes. As explained earlier, the base station database can include information utilized to determine a position of the receiver 102. For example, the base station database can include beacon or electronic endpoint information that can uniquely identify a radio beacon or an electronic endpoint. Furthermore, the base station database can include latitude, longitude, and/or elevation information related to each of the known base stations 103, 105, 107. Moreover, the location related information included in the base station database can be obtained with a measurement (e.g., via utilizing GPS). The location related information can also be based upon an observation of a set of base stations (e.g., base stations 103, 105, and 107) that are detected by a mobile radio (e.g., the receiver 102).

Figure 2:
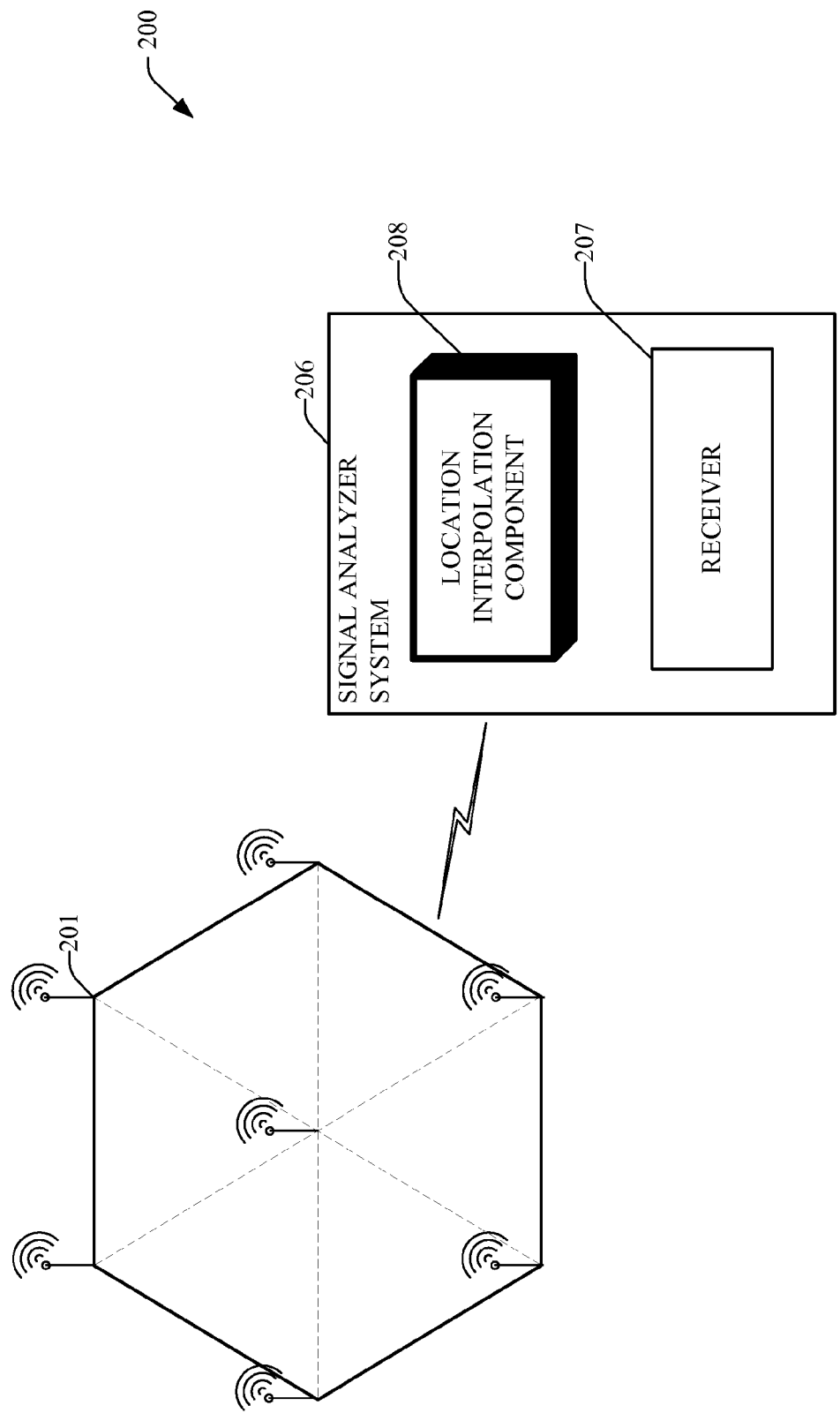
FIG. 2 illustrates a signal analyzer component with position interpolation capabilities, according to a particular aspect of the subject innovation.

FIG. 2 illustrates a signal analyzer system with position interpolation capabilities, according to a particular aspect of the subject innovation. The signal analyzer system 206 can include a location interpolation component 208 that evaluates kinetics/dynamics data for a motion of the analyzer component and/or receiver, and further considers such data in related calculations (e.g., determining location of the transmitter based on signal strength.) This data can include: path traveled by the analyzer system, speed, velocity, acceleration, and the like. Accordingly, a location of the signal analyzer system 206 and/or receiver 207 at time of receiving signal can be estimated by considering a difference between a prior known position and a next known position of the receiver, and a time that the signal is received at such estimated location. Hence, inaccuracies related to clustering of signals (e.g., associating received signals with known positions, as opposed to actual positions that signals were received) can be mitigated. A linear interpolation can also be employed, as:

Estimated Location of Receiver at Time of Receiving Radio Signal $$= p_1 + (p_2 - p_1) \times \left( \frac{t_r}{t_2 - t_1} \right)$$

wherein;
$t_r$=time of reception of signal;
$t_1$=time of report for prior known position;
$t_2$=time of report for next known position;
$p_1$=position at time of $t_1$; and
$p_2$=position at time $t_2$.

Accordingly, determinations for positioning of the receiver/signal analyzer system 206 can be adjusted and/or revised based on actual positions that signals were received. As explained earlier, the signal analyzer system 206 can detect base stations in local vicinity thereof based upon received or obtained signals. A search for or gathering of base station signals (or any disparate manner of identifying the base stations) can be continuous, periodic, or on-demand and can be initiated by a user action, autonomously by the system 200, and/or at the request of a remote service. For example, the signal analyzer component 206 can scan the communication environment for base stations. The result of the scan can be a set of base station identifiers and can include reception characteristics. For example, a scan for Wi-Fi access points can result in a Media Access Control address (MAC address) as a unique identifier for each detected access point (e.g., the base stations) and can include the signal strength of each detected access point. A scan for cell towers (e.g., 201) can yield receiving or obtaining cell tower identifications and the corresponding signal strength of each detected cell tower. Reception characteristics can be obtained or received in addition to, or in lieu of, signal strength. An example of an alternative reception characteristic can be a detection probability associated with the base station, which can be computed by scanning for base stations multiple times.

Figure 3:
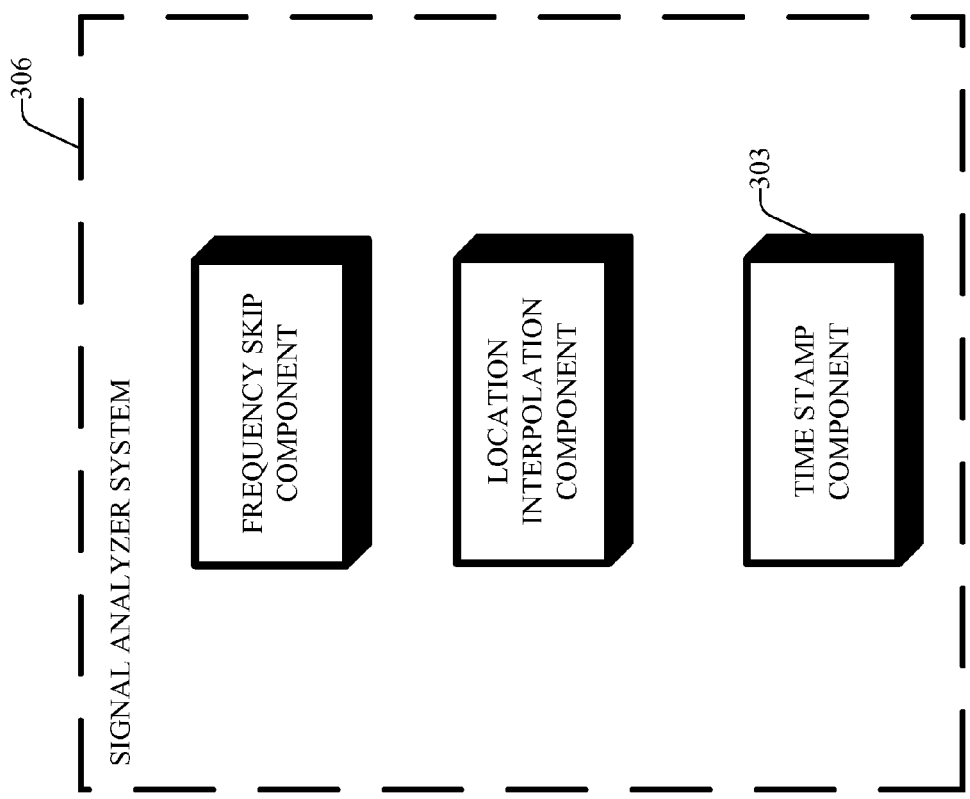
FIG. 3 illustrates a time stamping component as part of the signal analyzer system that stamps incoming data at time of reception of signal, according to an aspect of the subject innovation.

To mitigate potential for lags where the rate of data input overcomes processing capabilities, the subject innovation employs a time stamp component in accordance with an exemplary aspect. FIG. 3 illustrates such time stamp component 302 as part of the signal analyzer system 306 that stamps incoming data at time of reception of signal. Hence, inaccuracies that result from delays in processing capacity can be mitigated, and position of the signal analyzer system can be adjusted accordingly. For example, absent the time stamp component 303, if the radio signals are coming at rate which is higher than the processing capability of the signal analyzer system 306, then a location where the signal is processed can be well after the point when the signal is actually received and/or arrived, causing errors in data processing. To eliminate processing delay errors, a low level driver software can be modified to place an immediate timestamp on the incoming signals, to facilitate retrieval via employing interpolation with the time-stamp of the signal arrival time (instead of a subsequent time of processing.)

At processing time, the location of the signal is retrieved by using interpolation with the time-stamp of the signal arrival time instead of the current processing time. This eliminates the errors in position even though the processing may be delayed. Accordingly, at a time that a signal is received, a time stamp is associated therewith to allow for a subsequent interpretation of the location, where such signal was received.

Figure 4:
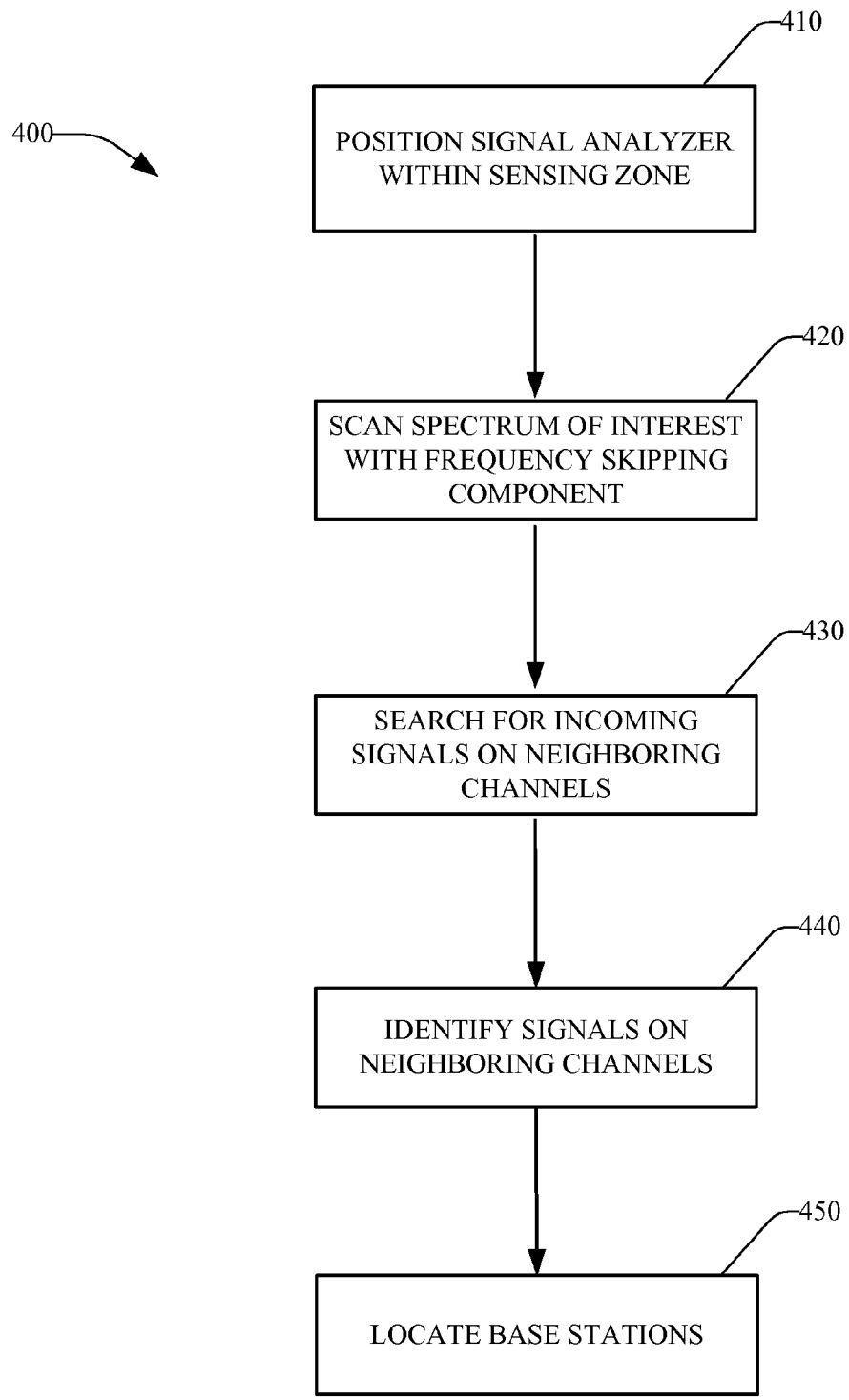
FIG. 4 illustrates an exemplary methodology of scanning a spectrum of interested frequencies via the frequency skipping component.

FIG. 4 illustrates an exemplary methodology 400 of scanning a spectrum of interested frequencies via a frequency skipping component in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation.

In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 410 a signal analyzer is positioned in a sensing zone/area, wherein the signal analyzer system can pick up receiving signals from a base station/access point. Subsequently, and at 420 the signal analyzer system can scan a frequency spectrum of interested frequencies, via a frequency skipping component associated therewith. The frequency skip component can skip channel frequencies such that the spectrum range is scanned without a typical requirement of tuning to all the channels during such scan. For example, in an 11 channel spectrum scenario, the initial scan can be performed by a channel selection of 1, 4, 7, 10, and while tuning for channel 4, signals on neighboring channels 3 and 7 can be detected and identified, albeit at a weaker strength. As illustrated at 430, based on sensitivity of the receiver, the neighboring channels can be designated and searched for incoming signals. A detected signal can then be identified on a neighboring channel at 440, and/or a channel that the receiver is tuned thereupon. At 450, a location for the base station that sends the signal can then be determined. Such frequency skipping can typically be implemented in a non-linear and/or non-randomized fashion.

Figure 5:
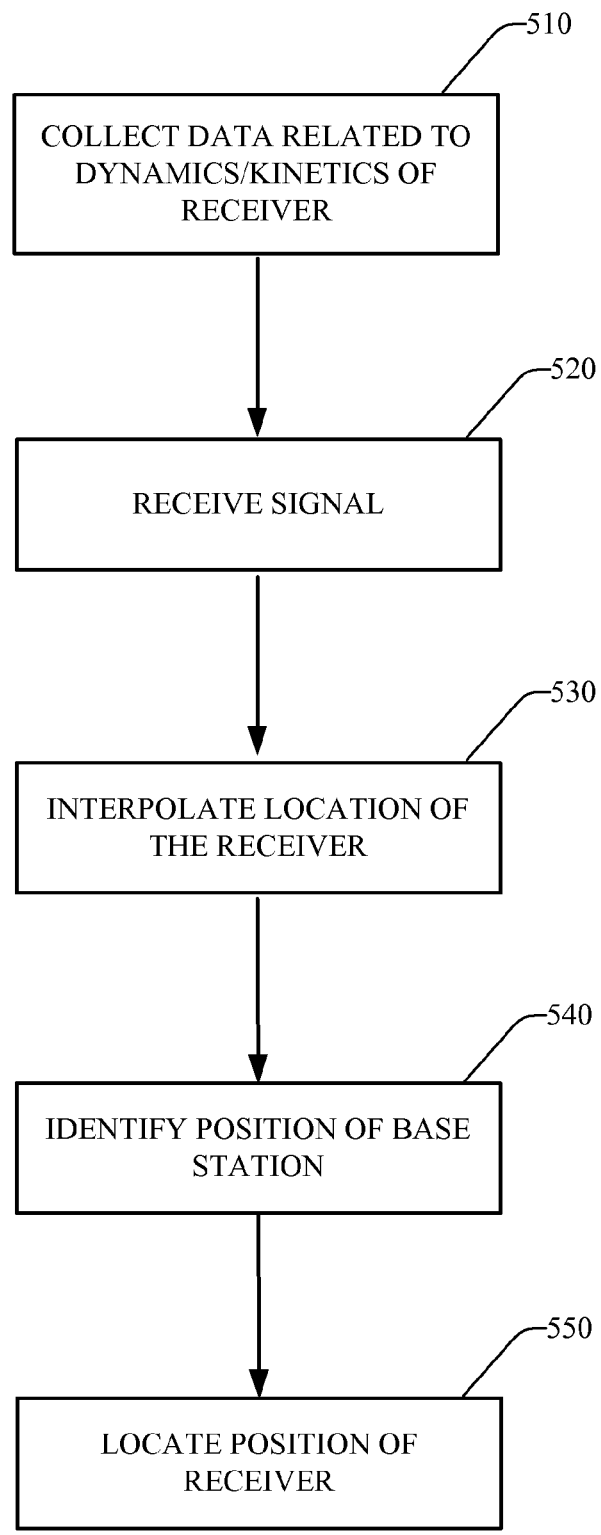
FIG. 5 illustrates a method of interpolating a location of a receiver, to determine an estimated position thereof at time of receiving a signal, according to an aspect of the subject innovation.

FIG. 5 illustrates a method of interpolating a location of a receiver, to determine an estimated position thereof at time of receiving a signal. Initially, and at 510, data that relates to dynamics/kinetics of the mobile receiver is being collected. Subsequently, and at 520 a signal is received by the mobile receiver. At 530, based on collected data related to motion of the receiver and known positions before and after receiving the signal, a location of the receiver at time of receiving the signal can be interpolated. Frequencies of interest are then scanned, and position of base stations identified, at 540. Location of the receiver can then be estimated at 550.

Hence, inaccuracies related to clustering of signals (e.g., associating received signals with known positions, as opposed to actual positions that signals were received) can be mitigated. A linear interpolation can also be employed, as described in detail supra.

Figure 6:
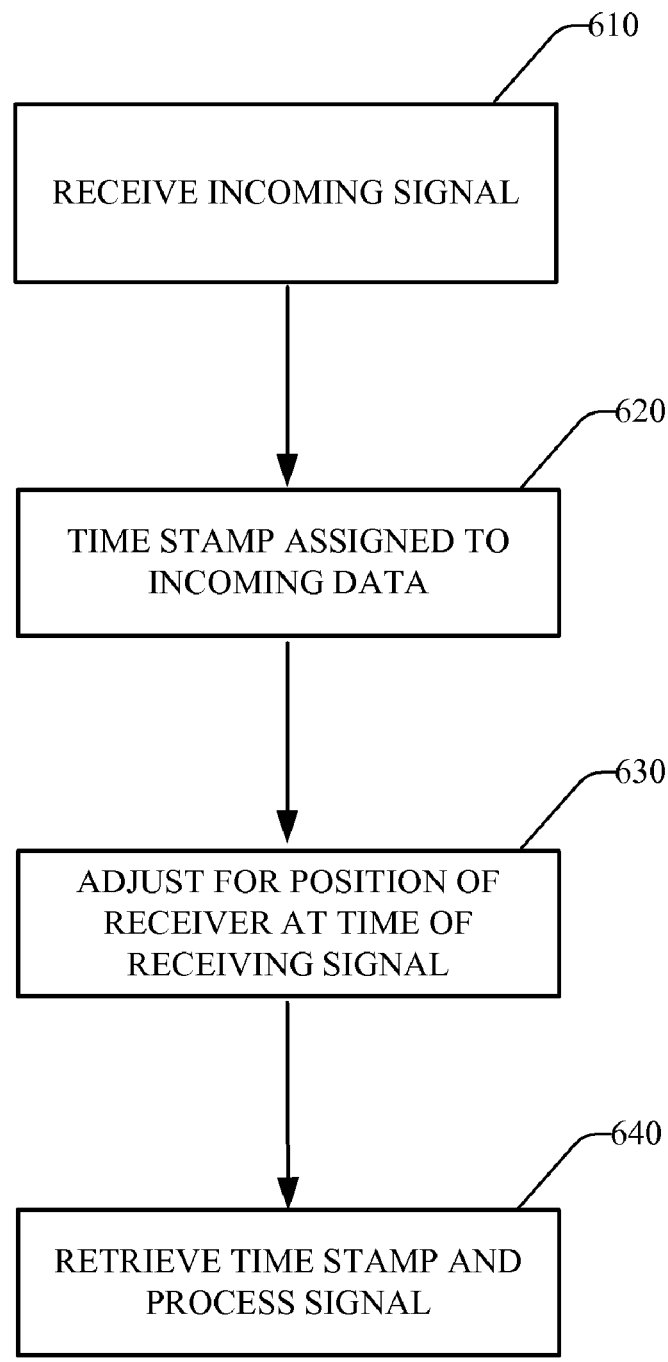
FIG. 6 illustrates a methodology of time stamping an incoming signal in accordance with an aspect of the subject innovation.

FIG. 6 illustrates a methodology of time stamping an incoming signal in accordance with an aspect of the subject innovation. Initially, and at 610 an incoming signal is being received by the receiver. Immediately upon signal receipt, and at 620 a time stamp is assigned thereto. Such time stamping enables adjusting for position of the receiver at time of actually receiving the signal, at 630. The time stamp for the signal can be retrieved, and the signal processed at 640. Hence, inaccuracies that result from delays in processing capacity can be mitigated, and position of the signal analyzer system can be adjusted accordingly.

Figure 7:
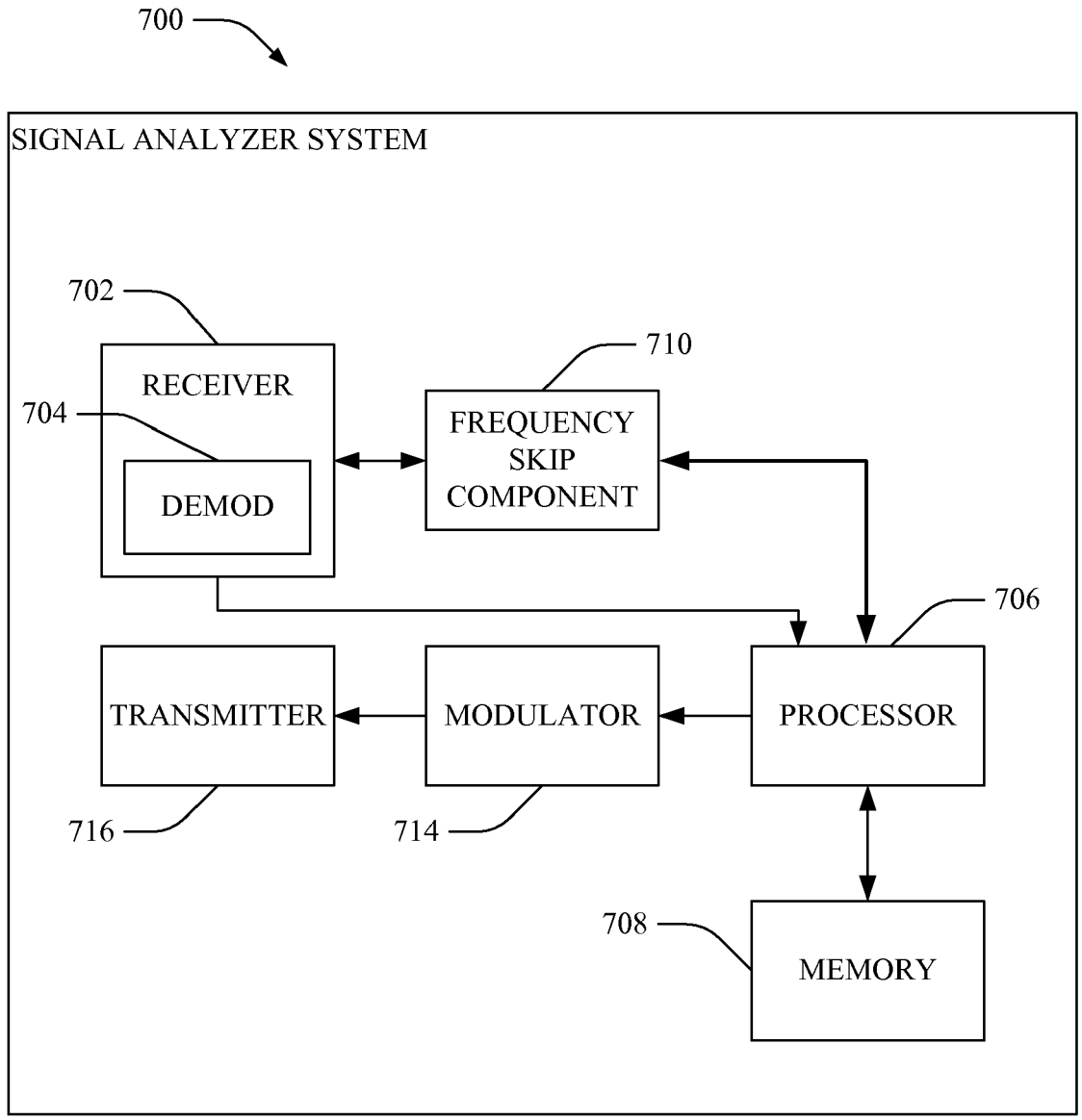
FIG. 7 illustrates a block diagram of a signal analyzer system in accordance with an aspect of the subject innovation.

FIG. 7 is an illustration of a signal analyzer system 700 that is employed in a wireless communication environment, in accordance with one or more aspects of the subject innovation. The signal analyzer system 700 comprises a receiver 702 that receives a signal, (e.g., from an antenna of a base station) and performs typical actions such as filtering, amplifying, down converting, and the like on the received signal. Receiver 702 can be a non-linear receiver, such as a maximum likelihood (ML)-MMSE receiver or the like. A demodulator 704 can demodulate the signal and provide data to a processor 706 for neighboring channel estimation. A frequency skip component 710 is provided to facilitate a scan of desired frequency spectrum, via skipping channels. Moreover, processor 706 can perform various functions such as analyzing information received by receiver 702 and/or generating information for transmission by a transmitter 716, and controlling one or more components of the system analyzer system 700. The processor 706 can further perform digital stream processing and/or positioning location calculations, and also other activities such as identification of a signal on neighboring channels associated with the signal analyzer system 700.

The signal analyzer system 700 can additionally comprise memory 708 that is operatively coupled to processor 706, and which stores information related to calculating thresholds and identifying neighboring channels, as well as any other suitable information for supporting frequency scanning and skipping neighboring channels that can be identified. Memory 708 can additionally store protocols and associated processes, such that user signal analyzer system 700 can employ stored protocols and/or algorithms to scan frequencies and identify base stations in a non-linear and/or non-randomized fashion, as described herein.

It will be appreciated that the memory 708 can be either volatile memory or nonvolatile memory, or can include both volatile and nonvolatile memory. For example, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. Moreover, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory. As illustrates, the signal analyzer system 700 can further include a modulator 714 and a transmitter 716 that can transmit the modulated signal to other devices/base stations.

In a related aspect, artificial intelligence (AI) components can be employed to facilitate signal detection and location interpolation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
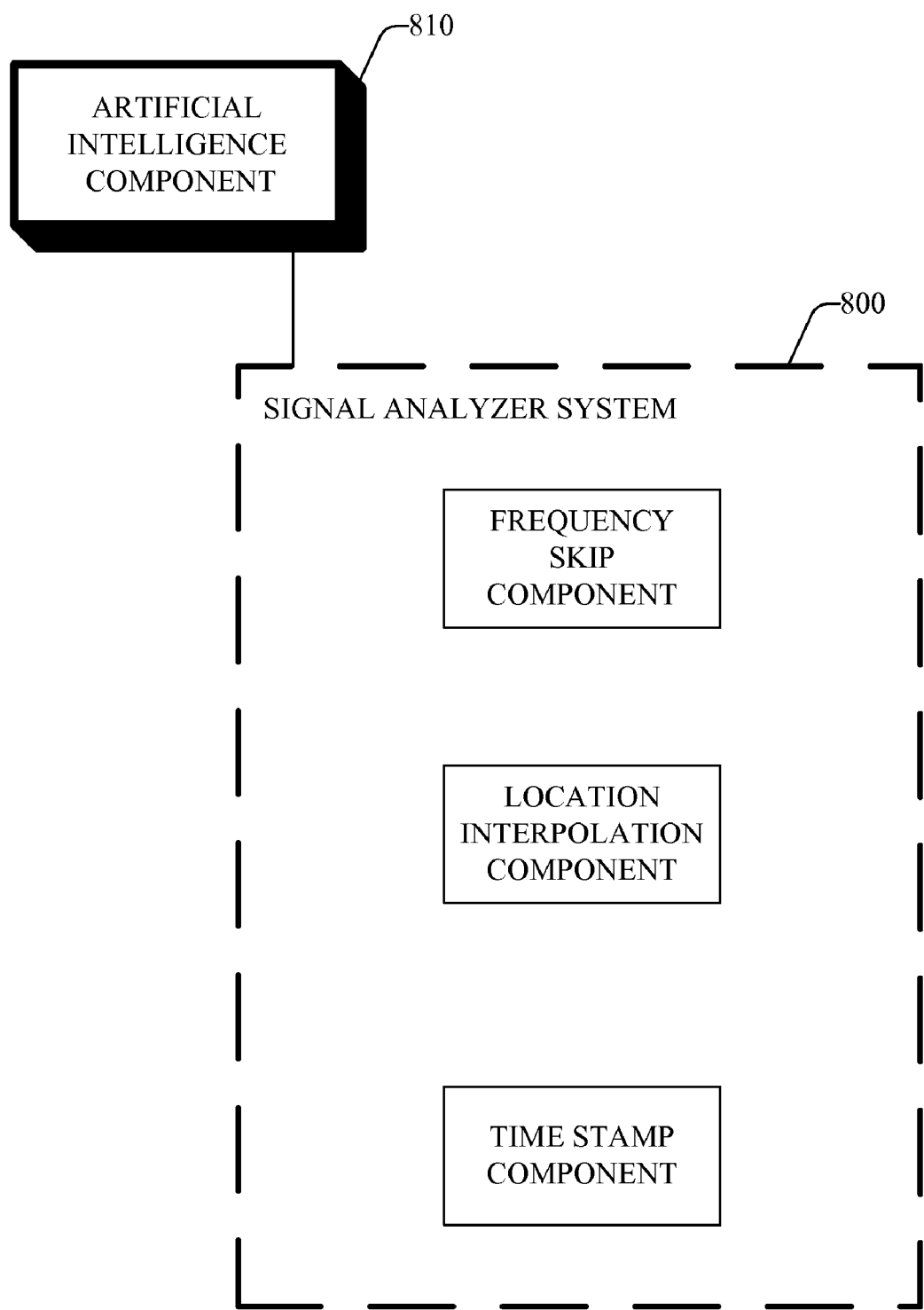
FIG. 8 illustrates an artificial intelligence component that can interact with the signal analyzer system to facilitate its operation in accordance with an aspect of the subject innovation.

FIG. 8 illustrates an artificial intelligence component 810 that can interact with the signal analyzer system 800 to facilitate its operation in accordance with an aspect of the subject innovation. For example, a process for interpolating location of the receiver and/or detecting a signal on a neighboring channel can be facilitated via an automatic classifier system and process. A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., path traveled by the receiver, channels the receiver are initially tuned for, and the like), and at what time of day to implement tighter criteria controls (e.g., day time affects of temperature on signal receipt, and other environmental factors.) Moreover, collection of data can be optimized by employing a plurality of synchronized receivers to improve efficiency. The receivers can be synchronized so they typically do not receive a same frequency at a same time. Relative abundance of signal frequencies can be considered when distributing frequency assignments between such receivers. The frequency distribution can be predetermined or can be set during operation and employed for adjusting frequency assignment.

Figure 9:
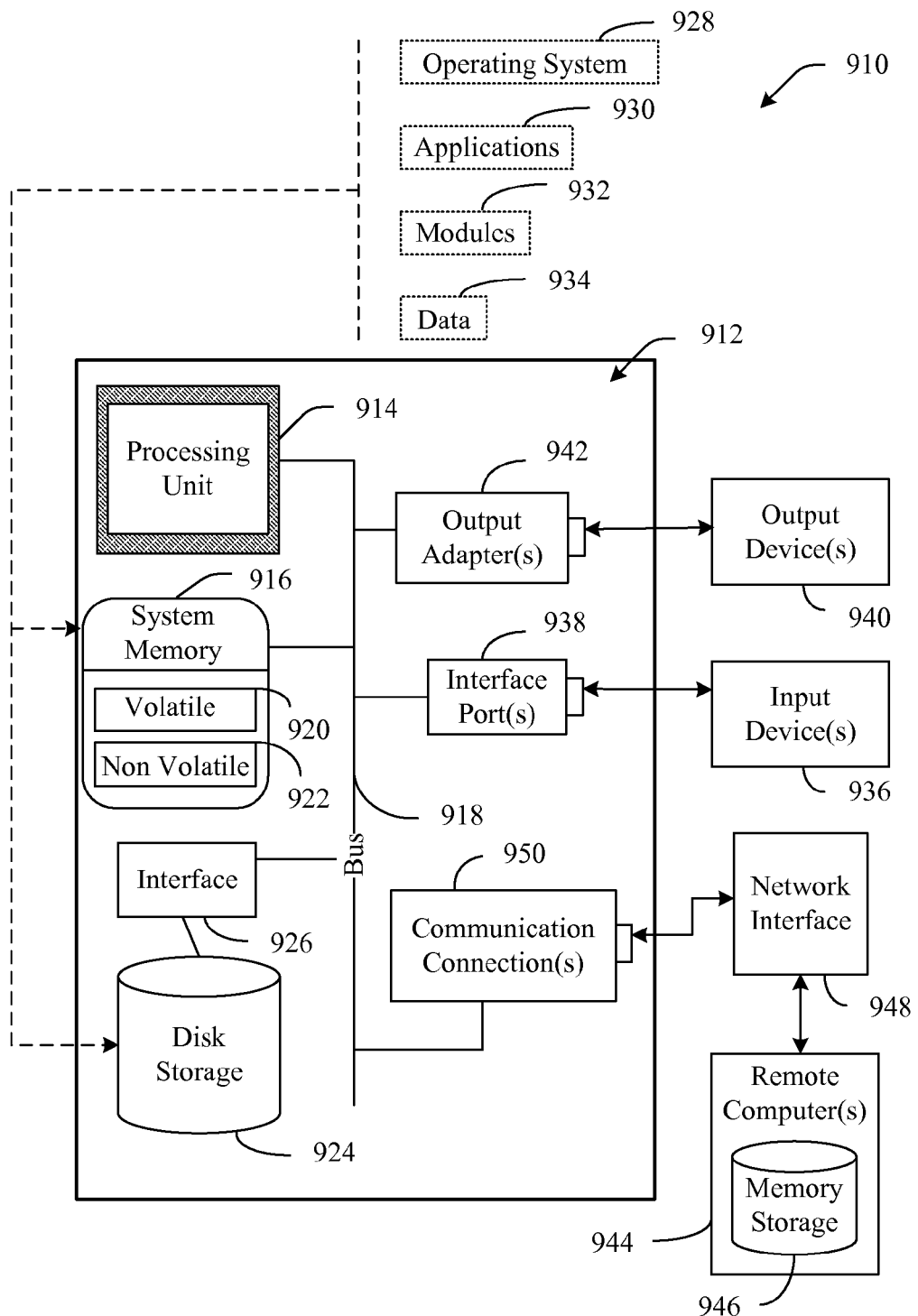
FIG. 9 illustrates an exemplary environment for implementing various aspects of the subject innovation.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
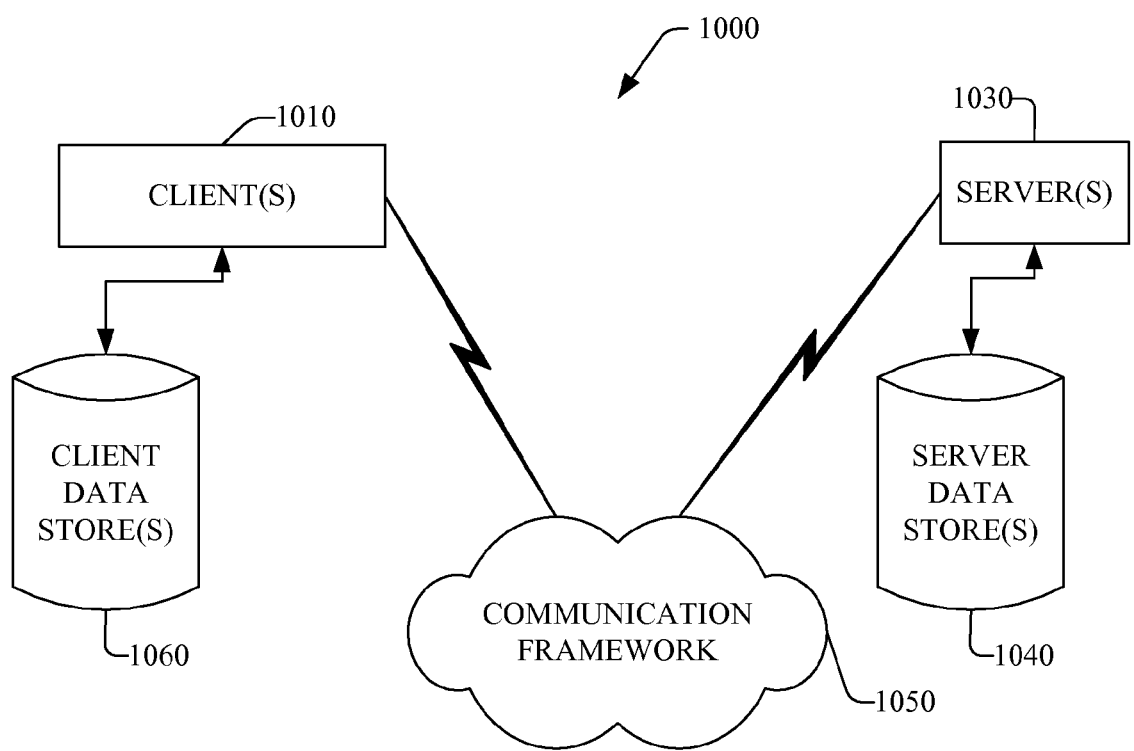
FIG. 10 is a schematic block diagram of an additional-computing environment that can be employed to implement the subject innovation.

FIG. 10 is a schematic block diagram of a sample-computing environment 1000 that can be employed to enable frequency skipping in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A communication system comprising:
a receiver at a location that receives signals over a spectrum of frequencies from one or more base stations, wherein each base station is at a position and each frequency is associated with a channel;
a signal analyzer unit associated with the receiver;
a location interpolation component that evaluates kinetics data for a motion of the receiver; and
a frequency skip component that is part of the signal analyzer unit and scans for one or more interested frequencies and skips one or more unscanned frequencies during the scan;
wherein the frequency skip component designates a channel selected at interval m as:

Channel at Interval $m=[1+(2B+1)\times m]$ [Mod $N$]

wherein;
N=number of interested channels:
B=+channel tolerance that represents number of neighboring channel(s) that can be detected at one of above and below a channel that the receiver is tuned for;
wherein the signal analyzer unit supplies a scan for the spectrum of frequencies,
and identifies received signals and the base stations associated with the identified signals.

2. The communication system of claim 1, wherein the location interpolation component performs a linear interpolation for the location of the receiver, and wherein the signal analyzer unit refines the receiver location based on the position of the one or more base stations.

3. The communication system of claim 1, wherein the signal analyzer system further comprises a time stamp component that stamps incoming data at time of reception of signal, and wherein the location interpolation component evaluates the kinetics data using the stamp to refine the interpolated location of the receiver.

4. The communication system of claim 1, further comprising a GPS system that supplies location related information for the receiver.

5. The communication system of claim 2, further comprising an artificial intelligence component that interacts with the signal analyzer unit to facilitate an operation thereof.

6. The communication system of claim 2, further comprising- a channel selectable in a non-random manner.

7. A method of scanning a spectrum of frequencies comprising:
receiving one or more signals over a spectrum of frequencies from one or more base stations by a receiver at a location associated with a signal analyzer unit, wherein each frequency is associated with a channel;
scanning one or more interested frequencies of a the spectrum of frequencies;
designating a channel selected at interval m as:

Channel at Interval $m=[1+(2B+1)\times m]$ [Mod $N$]

wherein
N=number of interested channels;
B=+channel tolerance that represents a number of neighboring channel(s) that can be detected at one of above and below a channel that the receiver is tuned for;
skipping one or more frequencies that are adjacent to the one or more interested frequencies;
detecting and identifying one or more signals on the one or more skipped frequencies; and
supplying a scan for the spectrum of frequencies.

8. The method of claim 7, further comprising locating a position of the receiver.

9. The method of claim 7, further comprising skipping the one or more unscanned frequencies in a nonrandomized manner.

10. The method of claim 7, further comprising interpolating a location of the receiver based on known positions thereof.

11. The method of claim 7, further comprising skipping the one or more unscanned frequencies in a non-linear fashion.

12. The method of claim 10, further comprising receiving one or more positions of the one or more base stations that transmit the signal and refining the interpolated location of the receiver using the position of the base stations.

13. The method of claim 10, further comprising acquiring data related to motion of the receiver and refining the interpolated location of the receiver using the motion data.

14. The method of claim 10, further comprising assigning a time stamp to the signal and refining the interpolated location of the receiver using the time stamp.

15. A method of determining a location of a receiver, the method comprising:
receiving one or more signals over a spectrum of frequencies originating from one or more base stations by a receiver at a location;
scanning one or more interested frequencies of the spectrum of frequencies;
designating a channel selected at an interval m as:

Channel at Interval $m=[1+(2B+1)\times m]$ [Mod N]

wherein
N=number of interested channels;
B=+channel tolerance that represents a number of neighboring channel(s) that can be detected at one of above and below a channel that the receiver is tuned for;
skipping one or more frequencies that are adjacent to the one or more interested frequencies;
detecting and identifying one or more signals on the one or more skipped frequencies;
determining a position of one or more base stations originating the identified signal; and
interpolating the location of the receiver based upon the determined position and one or more prior known positions of the one or more base stations.

16. The method of claim 15, further comprising evaluating kinetic data to determine a motion of the receiver and refining the interpolated location of the receiver using the said motion.

17. The method of claim 16, further comprising assigning a time stamp to the one or more received signals at time of reception of signal and further evaluating the kinetic data using the time stamp.

18. The method of claim 15, further comprising skipping the one or more unscanned frequencies in a non-linear fashion.

* * * * *